US012682154B2

(12) United States Patent
Richards et al.

(10) Patent No.: US 12,682,154 B2
(45) Date of Patent: Jul. 14, 2026

(54) DYNAMIC FACT CONTEXTUALIZATION IN SUPPORT OF ARTIFICIAL INTELLIGENCE (AI) MODEL DEVELOPMENT

(71) Applicant: INTERNATIONAL BUSINESS MACHINES CORPORATION, Armonk, NY (US)

(72) Inventors: John Thomas Richards, Honeoye Falls, NY (US); Thomas Hampp-Bahnmueller, Stuttgart (DE); Michael Hind, Cortlandt Manor, NY (US); David John Piorkowski, White Plains, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 18/193,168

(22) Filed: Mar. 30, 2023

(65) Prior Publication Data

US 2024/0330577 A1      Oct. 3, 2024

(51) Int. Cl.
| | |
|---|---|
| *G06F 3/0482* | (2013.01) |
| *G06F 3/0484* | (2022.01) |
| *G06F 40/106* | (2020.01) |
| *G06F 40/186* | (2020.01) |

(52) U.S. Cl.
CPC .......... *G06F 40/186* (2020.01); *G06F 3/0482* (2013.01); *G06F 3/0484* (2013.01); *G06F 40/106* (2020.01)

(58) Field of Classification Search
CPC ................................................ G06F 3/048–05
See application file for complete search history.

(56) References Cited

U.S. PATENT DOCUMENTS

| | | | |
|---|---|---|---|
| 8,819,629 B2 | 8/2014 | Sherrill | |
| 9,830,399 B2 | 11/2017 | Bernstein et al. | |
| 12,608,393 B1 * | 4/2026 | Balogun | ............... G06F 16/254 |
| 2004/0230894 A1 | 11/2004 | Elza et al. | |

(Continued)

FOREIGN PATENT DOCUMENTS

| | | |
|---|---|---|
| NL | 2013306 B1 | 5/2016 |

OTHER PUBLICATIONS

Anonymous, "A System and Method for Creating AI Pipeline from Factsheets," IP.com No. IPCOM000265984D, IP.com Electronic Publication Date: Jun. 2, 2021, 6 pp.

(Continued)

*Primary Examiner* — Daniel Rodriguez
(74) *Attorney, Agent, or Firm* — Steven M. Bouknight

(57) ABSTRACT

Provided are techniques for dynamic fact contextualization in support of AI model development. A template from a plurality of templates is selected, where the template includes definitions for identifying facts. The facts are retrieved from a facts repository based on the definitions. It is determined that that the facts are valid based on one or more policies. A FactSheet is generated using the template and the facts. A machine learning model is used to identify one or more deficient facts from the FactSheet. The FactSheet is displayed in a preview with the one or more deficient facts. One or more facts corresponding to the one or more deficient facts are located. The FactSheet is updated to correct the one or more deficient facts with the corresponding facts.

20 Claims, 11 Drawing Sheets

(56) References Cited

U.S. PATENT DOCUMENTS

| | | | | |
|---|---|---|---|---|
| 2014/0215305 A1* | 7/2014 | Vanderwende | ..... | G06F 3/04842 |
| | | | | 715/230 |
| 2015/0363725 A1* | 12/2015 | Andersson | ......... | G06Q 10/0631 |
| | | | | 705/7.23 |
| 2021/0133162 A1* | 5/2021 | Arnold | .................... | G06N 20/00 |
| 2021/0258160 A1* | 8/2021 | Kannan | .................. | G06N 20/00 |
| 2021/0374479 A1* | 12/2021 | Zambetti, Jr. | ......... | G06F 18/217 |
| 2022/0237477 A1 | 7/2022 | Tamilselvam et al. | | |
| 2023/0154222 A1* | 5/2023 | Desai | .................... | G06Q 20/102 |
| | | | | 382/100 |
| 2023/0169054 A1* | 6/2023 | Ghatage | ................ | G06F 16/215 |
| | | | | 707/692 |
| 2024/0257928 A1* | 8/2024 | Harnach | ................ | G16H 10/60 |

OTHER PUBLICATIONS

D. Piorkowski et al., "Evaluating a Methodology for Increasing AI Transparency: A Case Study," [Submitted on Jan. 24, 2022], https://arxiv.org/abs/2201.13224, 16 pp.

J. Richards et al., "A Methodology for Creating AI FactSheets," [Submitted on Jun. 24, 2020 (v1), last revised Jun. 28, 2020 (this version, v2)], https://arxiv.org/abs/2006.13796, 18 pp.

M. Arnold et al., "FactSheets: Increasing trust in AI services through supplier's declarations of conformity," in IBM Journal of Research and Development, vol. 63, No. 4/5, pp. 6:1-6:13, Jul. 1-Sep. 2019.

M. Hind e al. "Experiences with Improving the Transparency of AI Models and Services." In Extended Abstracts of the 2020 CHI Conference on Human Factors in Computing Systems (CHI EA '20). ACM, 1-8, 2020, 8 pp.

Y. Xie, "AI Model Lifecycle Management: Systematic Mapping Study and Solution for AI Democratisation," Master of Science Thesis, Delft University of Technology, Netherlands, 2020, 70 pp.

Mell, P. et al., "The NIST Definition of Cloud Computing (Draft)", Sep. 2011, Computer Security Division Information Technology Laboratory National Institute of Standards and Technology, Total 7 pp.

Mell, P. et al., "Effectively and Securely Using the Cloud Computing Paradigm", [online], Oct. 7, 2009, retrieved from the Internet at <URL: http:/csrc.nist.gov/groups/SNS/cloud-computing/cloud-computing-v26.ppt>, Total 80 pp.

"What Is a Workflow Engine?", IBM Corporation, Oct. 28, 2021, 11 pp., [online][retrieved Mar. 28, 2023] https://www.ibm.com/cloud/blog/workflow-engine.

"How to Write Doc Comments for the Javadoc Tool", Oracle, 2023, 33 pp. [online][retrieved Mar. 28, 2023] https://www.oracle.com/technical-resources/articles/java/javadoc-tool.html.

J. Acosta, et al., "Test-driven development", IBM Corporation, Mar. 28, 2003, 8 pp., [online][retrieved Mar. 28, 2023] https://www.ibm.com/garage/method/practices/code/practice_test_driven_development/.

"Compare product features and ratings to find the Task Management Software for your organization", Capterra, Mar. 28, 2023, 5 pp., [online][retrieved Mar. 28, 2023] https://www.capterra.com/sem-compare/task-management-software/.

C.Kime, "SIEM Explained: What is SIEM and How Does it Work?", eSecurity Planet, Feb. 10, 2022, 6 pp., [online] [retrieved Mar. 28, 2023] https://www.esecurityplanet.com/networks/siem-explained/.

* cited by examiner

400

410

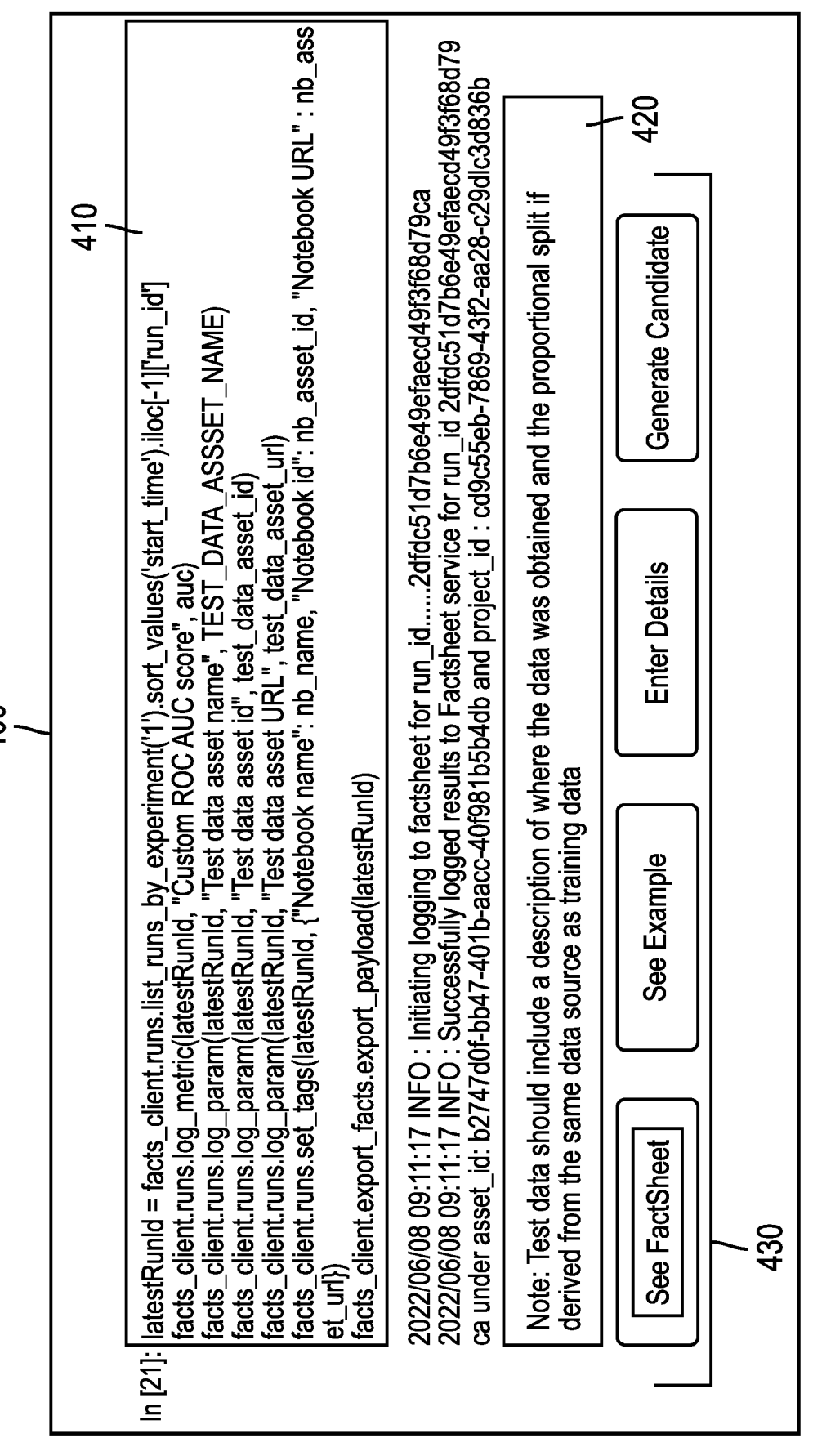

```
In [21]:  latestRunId = facts_client.runs.list_runs_by_experiment('1').sort_values('start_time').iloc[-1]['run_id']
          facts_client.runs.log_metric(latestRunId, "Custom ROC AUC score", auc)
          facts_client.runs.log_param(latestRunId, "Test data asset name", TEST_DATA_ASSSET_NAME)
          facts_client.runs.log_param(latestRunId, "Test data asset id", test_data_asset_id)
          facts_client.runs.log_param(latestRunId, "Test data asset URL", test_data_asset_url)
          facts_client.runs.set_tags(latestRunId, {"Notebook name": nb_name, "Notebook id": nb_asset_id, "Notebook URL": nb_ass
          et_url})
          facts_client.export_facts.export_payload(latestRunId)
```

2022/06/08 09:11:17 INFO : Initiating logging to factsheet for run_id......2dfdc51d7b6e49efaecd49f3f68d79ca
2022/06/08 09:11:17 INFO : Successfully logged results to Factsheet service for run_id 2dfdc51d7b6e49efaecd49f3f68d79
ca under asset_id: b2747d0f-bb47-401b-aacc-40f981b5b4db and project_id : cd9c55eb-7869-43f2-aa28-c29dlc33d836b Note: Test data should include a description of where the data was obtained and the proportional split if
derived from the same data source as training data

420

| See FactSheet | See Example | Enter Details | Generate Candidate |

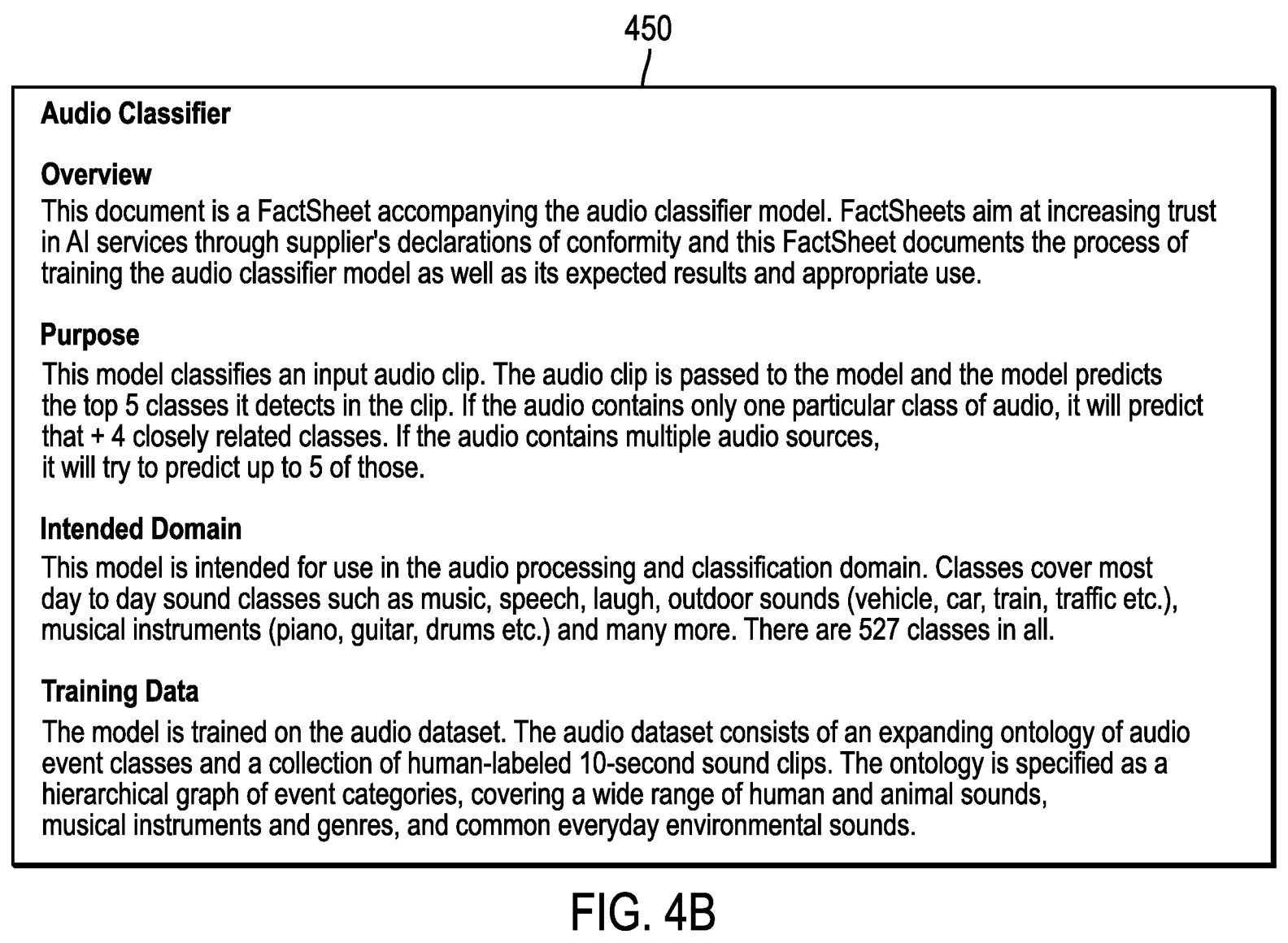

Audio Classifier

Overview

This document is a FactSheet accompanying the audio classifier model. FactSheets aim at increasing trust in AI services through supplier's declarations of conformity and this FactSheet documents the process of training the audio classifier model as well as its expected results and appropriate use.

Purpose

This model classifies an input audio clip. The audio clip is passed to the model and the model predicts the top 5 classes it detects in the clip. If the audio contains only one particular class of audio, it will predict that + 4 closely related classes. If the audio contains multiple audio sources, it will try to predict up to 5 of those.

Intended Domain

This model is intended for use in the audio processing and classification domain. Classes cover most day to day sound classes such as music, speech, laugh, outdoor sounds (vehicle, car, train, traffic etc.), musical instruments (piano, guitar, drums etc.) and many more. There are 527 classes in all.

Training Data

The model is trained on the audio dataset. The audio dataset consists of an expanding ontology of audio event classes and a collection of human-labeled 10-second sound clips. The ontology is specified as a hierarchical graph of event categories, covering a wide range of human and animal sounds, musical instruments and genres, and common everyday environmental sounds.

FIG. 4B

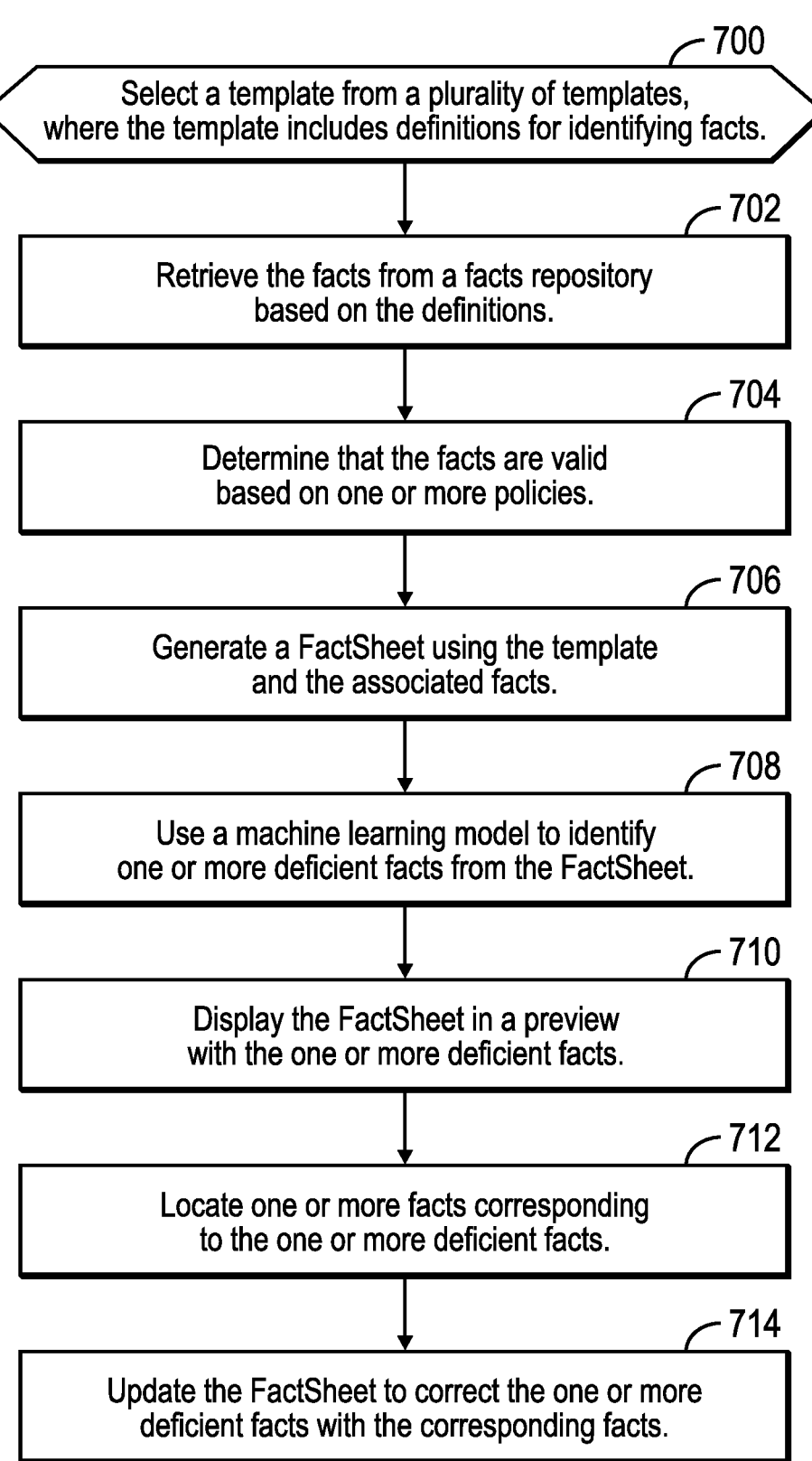

700

Select a template from a plurality of templates, where the template includes definitions for identifying facts.

702

Retrieve the facts from a facts repository based on the definitions.

704

Determine that the facts are valid based on one or more policies.

706

Generate a FactSheet using the template and the associated facts.

708

Use a machine learning model to identify one or more deficient facts from the FactSheet.

710

Display the FactSheet in a preview with the one or more deficient facts.

712

Locate one or more facts corresponding to the one or more deficient facts.

714

Update the FactSheet to correct the one or more deficient facts with the corresponding facts.

FIG. 7

DYNAMIC FACT CONTEXTUALIZATION IN SUPPORT OF ARTIFICIAL INTELLIGENCE (AI) MODEL DEVELOPMENT

BACKGROUND

Embodiments of the invention relate to dynamic fact contextualization in support of AI model development. In particular, embodiments of the invention relate to dynamic fact contextualization of AI documentation in support of AI model development.

With AI model development, facts are gathered throughout the AI lifecycle and used to generate a FactSheet. However, as the facts are gathered throughout the AI model lifecycle, fact producers are not able to easily see the current state of fact collection and how that relates to eventual documentation as a FactSheet.

Without awareness of this emerging context, fact producers may not know what to record and how to record it, especially for non-automated facts that require someone to compose the fact.

This complicates the creation of facts that meet the needs of various fact consumers and that contribute to the overall documentation objectives for AI governance (e.g., AI model validation).

SUMMARY

In accordance with certain embodiments, a computer-implemented method comprising operations is provided for dynamic fact contextualization in support of AI model development. In such embodiments, a template from a plurality of templates is selected, where the template includes definitions for identifying facts. The facts are retrieved from a facts repository based on the definitions. It is determined that that the facts are valid based on one or more policies. A FactSheet is generated using the template and the facts. A machine learning model is used to identify one or more deficient facts from the FactSheet. The FactSheet is displayed in a preview with the one or more deficient facts. One or more facts corresponding to the one or more deficient facts are located. The FactSheet is updated to correct the one or more deficient facts with the corresponding facts.

In accordance with other embodiments, a computer program product comprises a computer readable storage medium having program code embodied therewith, the program code executable by at least one processor to perform operations for dynamic fact contextualization in support of AI model development. In such embodiments, a template from a plurality of templates is selected, where the template includes definitions for identifying facts. The facts are retrieved from a facts repository based on the definitions. It is determined that that the facts are valid based on one or more policies. A FactSheet is generated using the template and the facts. A machine learning model is used to identify one or more deficient facts from the FactSheet. The FactSheet is displayed in a preview with the one or more deficient facts. One or more facts corresponding to the one or more deficient facts are located. The FactSheet is updated to correct the one or more deficient facts with the corresponding facts.

In accordance with yet other embodiments, a computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations for dynamic fact contextualization in support of AI model development. In such embodiments, a template from a plurality of templates is selected, where the template includes definitions for identifying facts. The facts are retrieved from a facts repository based on the definitions. It is determined that that the facts are valid based on one or more policies. A FactSheet is generated using the template and the facts. A machine learning model is used to identify one or more deficient facts from the FactSheet. The FactSheet is displayed in a preview with the one or more deficient facts. One or more facts corresponding to the one or more deficient facts are located. The FactSheet is updated to correct the one or more deficient facts with the corresponding facts.

BRIEF DESCRIPTION OF THE SEVERAL VIEWS OF THE DRAWINGS

Referring now to the drawings in which like reference numbers represent corresponding parts throughout:

FIGS. 4A, 4B, and 4C illustrate interactions with a development tool from within which a fact may be produced.

FIG. 7 illustrates, in a flowchart, operations for generating a using a FactSheet in accordance with certain embodiments.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments are directed to AI model development by automatically identifying invalid facts and/or missing facts from AI documentation and providing a process for updating the AI documentation to correct the data. In addition, embodiments support AI-based system governance (i.e., governing how an AI model or service is constructed and deployed). Moreover, embodiments guide users on how to fix invalid facts and how to provide missing facts. The term deficient facts refers to one or more invalid facts and/or one or more missing facts.

Figure 1:
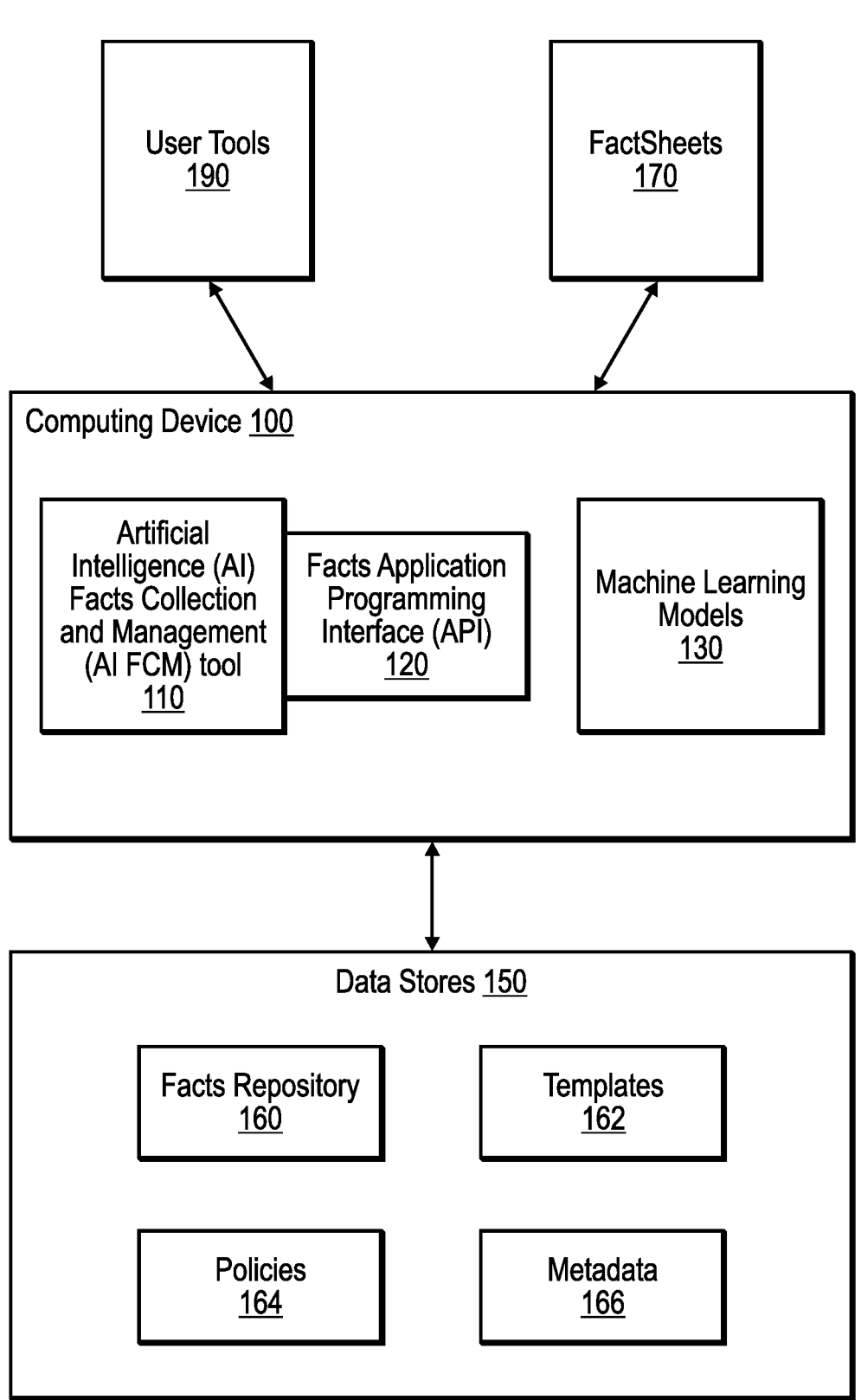
FIG. 1 illustrates, in a block diagram, a computing environment in accordance with certain embodiments.

FIG. 1 illustrates, in a block diagram, a computing environment in accordance with certain embodiments. A computing device 100 includes an Artificial Intelligence (AI) Facts Collection and Management (AI FCM) tool 110 and machine learning models 130. The AI FCM tool 110 provides a facts Application Programming Interface (API) 120. The facts API 120 may be used to, save and update individual facts, retrieve a set of facts in order to assemble a FactSheet for viewing, etc.

The computing device 100 is connected to data store 150. The data store 150 include a facts repository 160, templates 162 to generate FactSheets, policies 164, and metadata 166. The facts repository 160 stores facts (e.g., about the development and deployment of an AI model). A template 162 may be used to generate a FactSheet 170. A policy 164 may be described as a set of rules that identify the facts that are to be collected to populate a factsheet using a particular template 162. In addition, a policy 164 is associated with a fact. In certain embodiments, the policy 164 refers to one or more specific facts or one more fact types and may specify whether a fact is required, an expected value range for a fact, etc., and the policy author associates the policy 164 with one or more facts. There may be metadata 166 for facts and for policies 164. Examples of the metadata 166 include: an identifier of who set a fact or policy, a timestamp of when the fact or policy was set, the source/user tool for the fact or policy, the user tool context for a fact (e.g., a line/cell in a notebook), etc. The AI FCM tool 110 may use facts, metadata, and one or more policies to complete the template and generate the FactSheet.

User tools 190 send request to the AI FCM tool 110 by using the facts API 120. The AI FCM tool 110 responds to the requests using the facts repository 160, templates 162, policies 164, and metadata 166, as well as, the FactSheets 170.

A FactSheet has two aspects. First, a FactSheet may be described as a document containing facts about an AI model's purpose, development, deployment, etc. to improve transparency and support governance. Second, a FactSheet 168 may be described as having a supporting process to gather the collection of facts throughout the AI model lifecycle, from multiple personas, tools (e.g., user tools). Embodiments focus on the first aspect to improve AI model development and deployment. Thus, the FactSheet may be described as a document, as well as, a tool. In certain embodiments, the FactSheet may be referred to as a FactSheet tool.

The AI FCM tool 110 allows fact producers to understand how facts fit into the larger context of a finished FactSheet. The AI FCM tool 110 allows fact producers to see what one or more fact consumers will see in the FactSheet document as the facts are being produced. The AI FCM tool 110 provides guidance to fact producers on: expected fact quality, level of detail, and consistent terminology use. The AI FCM tool 110 provides guidance on internal and external standards compliance and metric threshold requirements. The AI FCM tool 110 provides examples, explanations, etc. to support fact creation. The AI FCM tool 110 provides producers of a fact a clear sense of how close they may be to completing the required FactSheet documentation or their portion of the documentation. The AI FCM tool 110 makes it easier to see and resolve documentation conflicts as they emerge.

Given a collection of facts stored in the facts repository 160, the AI FCM tool 110 provides a preview (e.g., user interface) to enable a fact producer to review the current state of the FactSheet within current user tools/environment (e.g., within a machine learning tool or a notebook tool that the fact producer is using) and tailored to the role and situation of that fact producer. The preview also shows the context, including: missing fields, requirements, guidance, progress indication, etc. In certain embodiments, requirements may be described as "hard" in that a certain fact is to be provided at a particular time or a certain value is expected to be in a certain range, while guidance is "soft" in that guidance may be a recommendation (e.g., typically a particular kind of metric is provided in a particular context or that an example approach/code snippet may help compute an appropriate fact.) The preview provides multiple perspectives tailored to specific needs of different user personas who may read the final documentation, recommended next operations, next facts to collect, a team view (e.g., who did what), and a collaborative editing view.

The AI FCM tool 110 provides affordances in the preview to ease completion. For example, affordances include pre-populated forms or templates with facts, syntax highlighting, automatic completion of facts, automatic code/template generation to calculate facts, tool tips, recommendations for more facts, etc.

In certain embodiments, a FactSheet is input to a machine learning model, which further analyzes the document and identifies missing facts. In certain embodiments, facts and metadata are input to another system (which may be use a database lookup or the output of a machine learning model), which outputs a suggestion. The suggestion may be a missing fact, the suggestion may be an approach on how to provide the missing fact (e.g., how to provide a missing value) or the suggestion may be an example of the missing fact.

Figure 2:
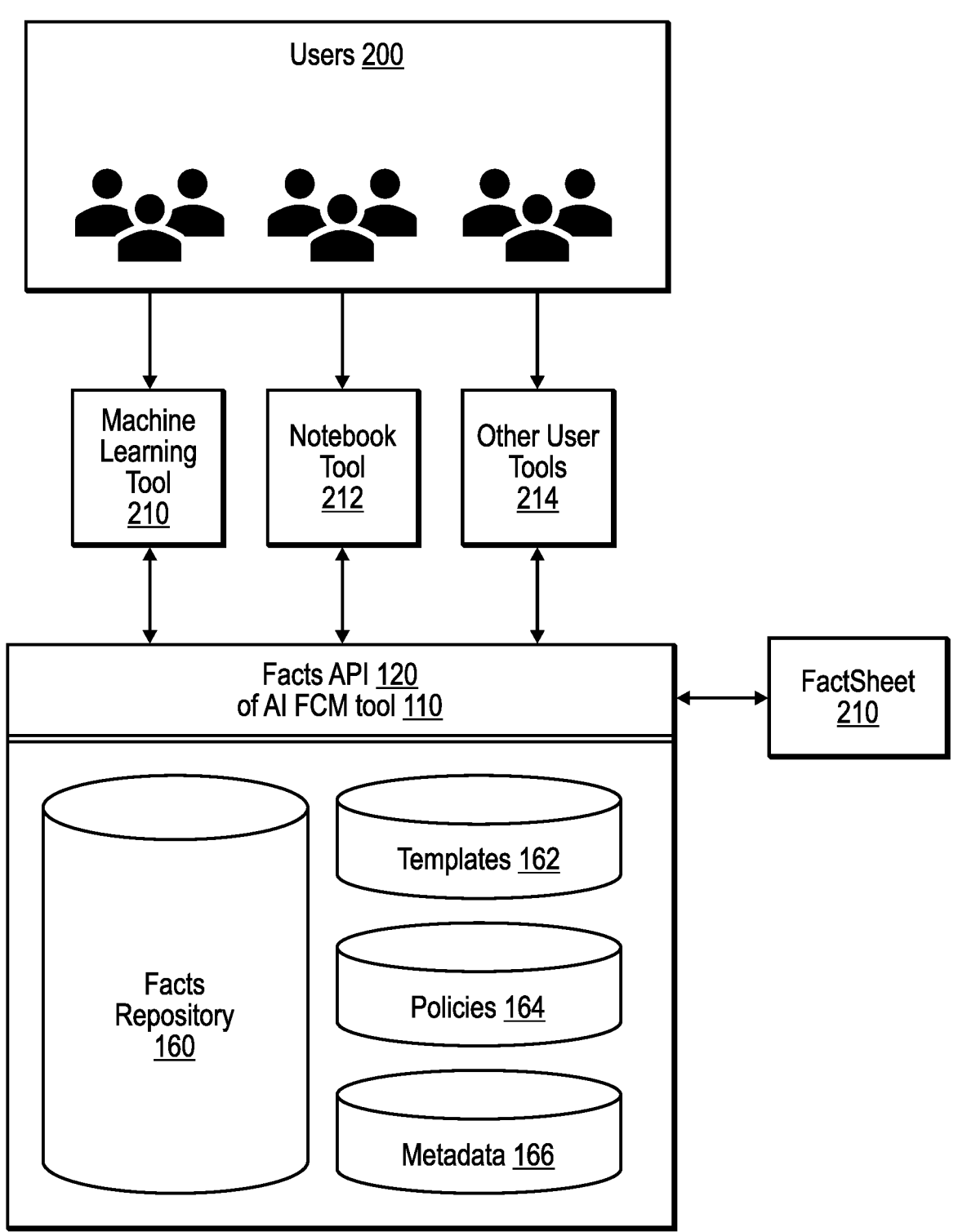
FIG. 2 illustrates interaction of components in accordance with certain embodiments.

FIG. 2 illustrates interaction of components in accordance with certain embodiments. In FIG. 2, users 200 (e.g., fact producers or stakeholders in creating an AI model) are using user tools, including a machine learning tool 210, a notebook tool 212 or other tools 214 to issue requests to the AI FCM tool 110 via the facts API 120. The AI FCM tool 110 then interacts with a FactSheet 210 to obtain data and uses that data, along with facts in the facts repository 160, the templates 162, the policies 164, and the metadata 166, to generate a response that is sent back to one of the user tools 210, 212, 214.

The facts repository 160 collects and integrates facts from different tools 210, 212, 214 being used by different users 200 (e.g., different stakeholders in a development lifecycle of the AI model).

Figure 3:
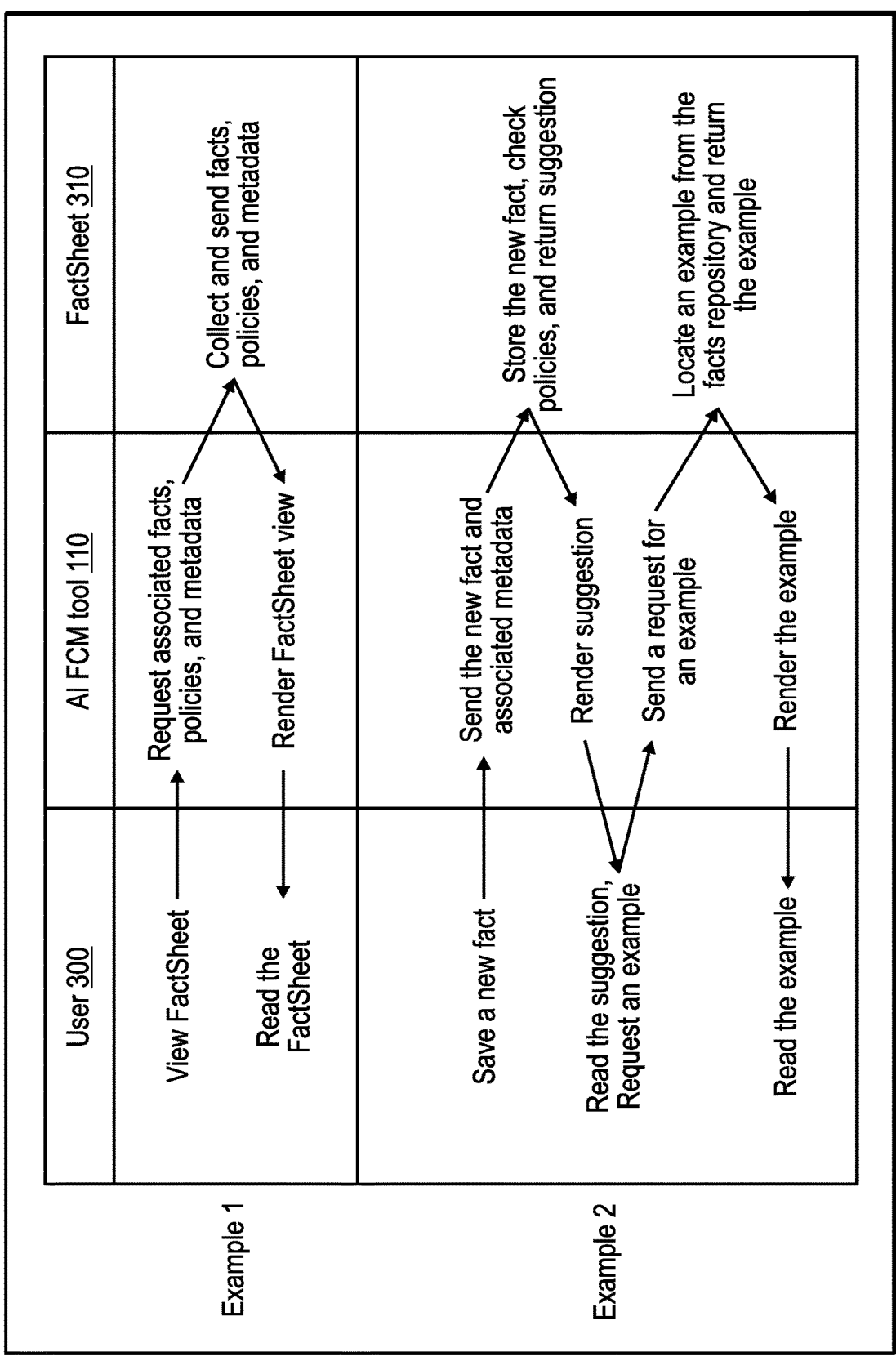
FIG. 3 illustrates examples of interaction of a user, an AI Facts Collection and Management (AI FCM) tool, and a FactSheet in accordance with certain embodiments.

FIG. 3 illustrates examples of interaction of a user 300, the AI FCM tool 110, and a FactSheet 310 in accordance with certain embodiments. The FactSheet 310 may be described as a document, as well as, a tool (and so may be referred to as a FactSheet tool). In the first example, the user issues a request to view the FactSheet 310 to the AI FCM tool 110. The AI FCM tool 110 sends a request and associated facts, policies, and metadata to the FactSheet 310. The FactSheet collects and sends facts, policies, and metadata to the AI FCM tool 110. The AI FCM tool 110 renders a preview. The user 300 reads the FactSheet.

In the second example, the user issues a request to save a new fact to the AI FCM tool 110. The AI FCM tool 110 sends the new fact and associated metadata to the FactSheet 310. In certain embodiments, the AI FCM tool 110 automatically identifies and retrieves the metadata, while, in other embodiments, the AI FCM tool 110 receives the metadata from a user interactively. The FactSheet 310 stores the new fact, checks policies for this type of fact, and returns a suggestion based on the policies (e.g., a suggestion of a valid value range or a technique or example to help compute the fact). The AI FCM tool 110 renders the suggestion in the preview. The user 300 reads the suggestion and issues a request to see an example. The AI FCM tool 110 sends a request for an example to the FactSheet 310. The FactSheet 310 locates an appropriate example from the facts repository and returns the example. The AI FCM tool 110 renders the example in the preview. The user 300 reads the example.

In certain embodiments, the user 300 interacts with user interface selectors (e.g., buttons or menu items) of the FactSheet 310 to issue requests. In certain other embodiments, the user 300, while using a user tool, uses a particular API to send a particular request to the AI FCM tool 110.

Figure 4C:
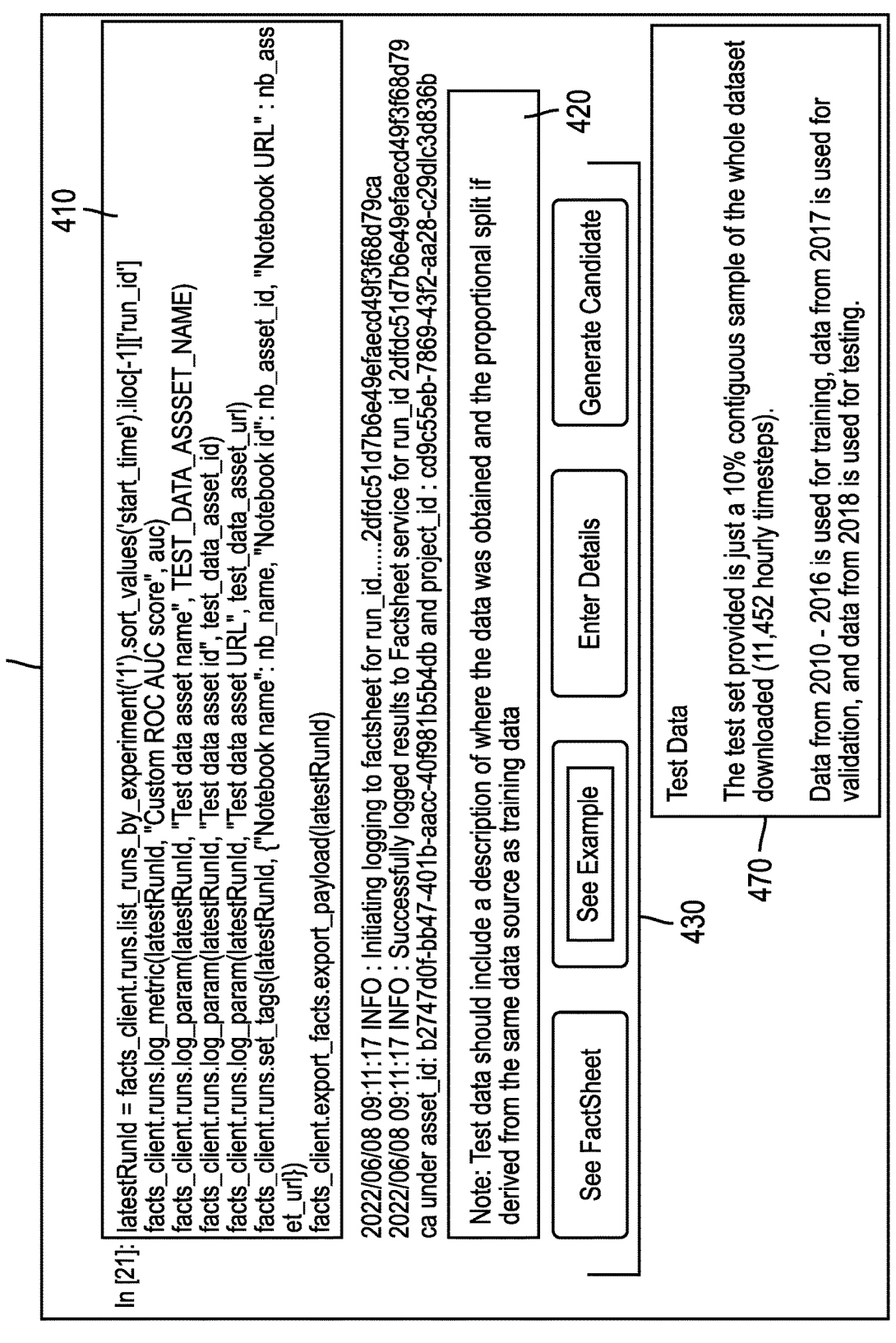

FIGS. 4A, 4B, and 4C illustrate interactions with a development tool from within which a fact may be produced. In particular, FIG. 4A illustrates the development tool. The development tool 400 includes facts programming code 410, an indication of what documentation fact is missing 420 (with reference to test data in this example), and user interface selectors 430. The user interface selectors 430 allow selection of: "See FactSheet", "See Example", "Enter Details" (for the FactSheet), and "Generate Candidate" (examples). In the example of FIG. 4A, the indication of what is missing 420 states "Test data should include a description of . . . ", and the "Enter Details" selection allows a user to type in the required description. In FIG. 4A, "See FactSheet" has been selected by the user, and, in response to this selection, the AI FCM tool 110 displays the FactSheet 450 (FIG. 4B) as it is currently filled in. The FactSheet 450 is an example based an audio classifier AI model.

In FIG. 4C, "See Example" has been selected, and, in response to this selection, the AI FCM tool 110 displays an example 470 of how to document test data. Since the missing test data was described in block 420, providing example 470 enables a fact producer to provide the needed information.

Figure 5:
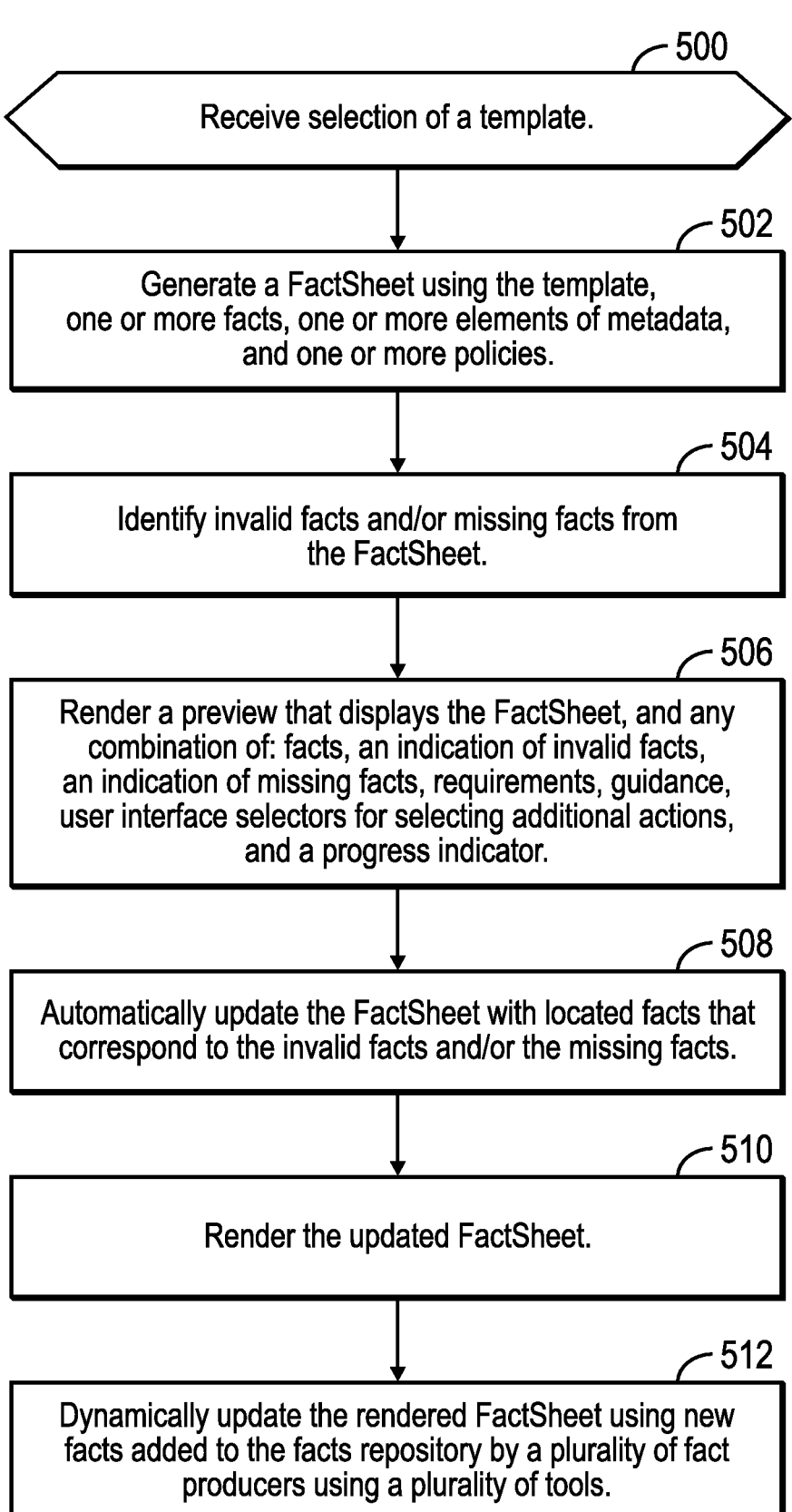
FIG. 5 illustrates, in a flowchart, operations for dynamic fact contextualization in support of AI model development in accordance with certain embodiments.

FIG. 5 illustrates, in a flowchart, operations for dynamic fact contextualization in support of AI model development in accordance with certain embodiments. Control begins at block 500 with the AI FCM tool 110 receiving selection of a template. In block 502, the AI FCM tool 110 generates a FactSheet using the template, one or more facts, one or more elements of metadata, and one or more policies. In block 504, the AI FCM tool 110 identifies missing facts from the FactSheet based on the one or more policies and/or the template. In block 506, the AI FCM tool 110 renders a preview that displays the facts, an indication of missing facts, requirements, guidance, the FactSheet, user interface selectors for selecting additional actions, and a progress indicator. In block 508, the AI FCM tool 110 automatically updated the FactSheet with facts to complete the missing facts. In block 510, the AI FCM tool 110 dynamically updates the rendered FactSheet using new facts added to the facts repository by a plurality of fact producers using a plurality of tools. In certain embodiments, the new facts are added at some point after the FactSheet has been generated and is being viewed, supporting dynamic updating of the view itself.

Figure 6:
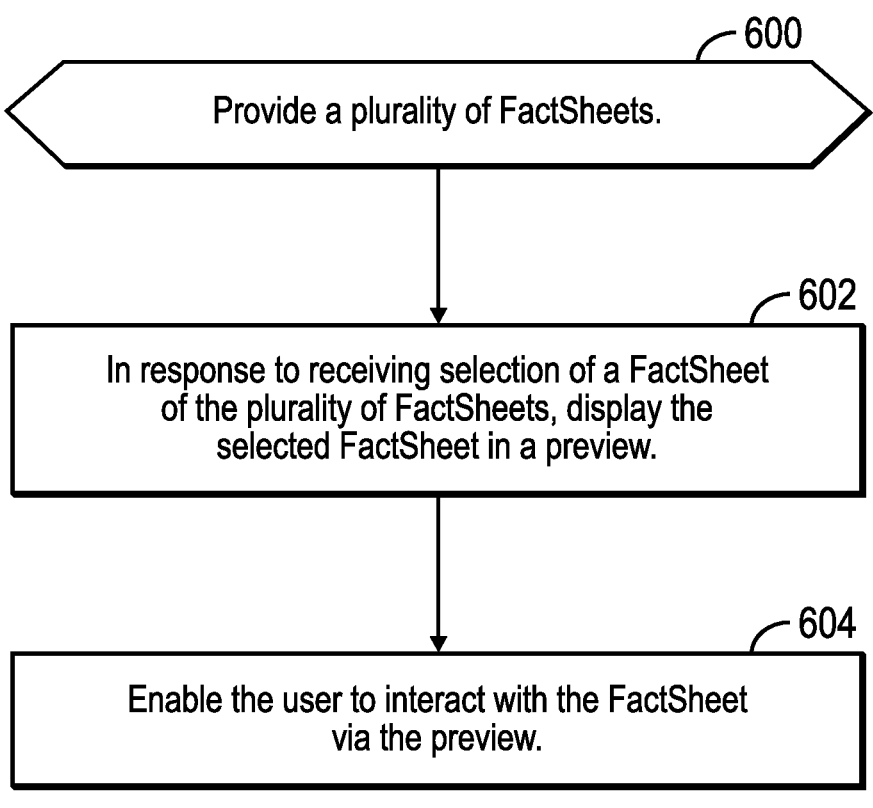
FIG. 6 illustrates, in a flowchart, operations for using a FactSheet for AI model deployment in accordance with certain embodiments.

FIG. 6 illustrates, in a flowchart, operations for using a FactSheet for AI model deployment in accordance with certain embodiments. Control begins at block 600 with the AI FCM tool 110 provides a plurality of FactSheets. In block 602, in response to receiving selection of a FactSheet of the plurality of FactSheets, the AI FCM tool 110 displays the selected FactSheet in a preview. In block 604, the AI FCM tool 110 enables (i.e., allows) the user to interact with the FactSheet via the preview. In certain embodiments, the AI FCM tool 110 also allows an AI model associated with the selected FactSheet to be deployed.

FIG. 7 illustrates, in a flowchart, operations for generating a using a FactSheet in accordance with certain embodiments. Control begins at block 700 with the AI FCM tool 110 selecting a template from a plurality of templates, where the template includes definitions for identifying facts. In block 702, the AI FCM tool 110 retrieves the facts from a facts repository based on the definitions. In block 704, the AI FCM tool 110 determines that the facts are valid based on one or more policies. In block 706, the AI FCM tool 110, generates a FactSheet using the template and the facts.

In block 708, the AI FCM tool 110 uses a machine learning model to identify one or more deficient facts from the FactSheet. In certain embodiments, the one or more deficient facts may be one or more invalid facts, one or more missing facts, or both one or more invalid facts and one or more missing facts.

In block 710, the AI FCM tool 110 displays the FactSheet in a preview with the one or more deficient facts. In block 712, the AI FCM tool 110 locates one or more facts corresponding to the one or more deficient facts. In certain embodiments, the one or more deficient facts are located automatically by the AI FCM tool 110. In certain embodiments, the corresponding facts may be referred to as "correcting" facts as they are used to correct the deficient facts. In block 714, the AI FCM tool 110 updates the FactSheet to correct the one or more deficient facts with the corresponding facts.

In certain embodiments, the AI FCM tool 110 is able to store, update, and retrieve facts from a facts repository in response to requests from fact producers. The AI tool 110 provides a preview to enable the fact producers to view the FactSheet within the environment that they are working in as they are producing facts in that environment. In addition, the AI tool 110 provides one or more templates and one or more policies for use in generating one or more FactSheets.

In certain embodiments, a fact producer selects a template (or there is a default template). Then, the AI FCM tool 110 displays the preview according to the fact requirements and other policies that apply to the template. The preview is connected to the facts repository, and the AI FCM tool 110 displays already completed information in the preview.

In certain embodiments, the AI FCM tool 110 identifies to the user missing facts and other policy-related requirements they are responsible for in the preview. The environment provides the user a way to store facts to the facts repository and display those facts in the preview. In certain embodiments, the AI FCM tool 110 updates the preview to reflect the state of the fact repository across multiple fact producers (e.g., a group of fact producers or all fact producers).

The AI FCM tool 110 enables visualization of intermediate facts and allows interaction via the user interface selectors of the preview. The AI FCM tool 110 generates a FactSheet that is dynamic and shared (by different users). The AI FCM tool 110 prompts users for missing facts or sub-standard facts.

The AI FCM tool 110 provides guidance, roles, and an auto-populating feature based on what others or other tools are generating. Example roles include: model developer, model validator, model approver, model deployment staff, etc. The auto-populating feature automatically provide example answers/fact values based on what other data scientists and other tools have provided as values for facts in previous and similar fact gathering instances.

With embodiments, the AI FCM tool 110 provides the ability to understand at the point of fact creation where a fact fits in the larger document context and what that fact should convey and to whom. The AI FCM tool 110 not only indicates what is missing, but what the threshold of acceptability is. The AI FCM tool 110 also offers suggestions (e.g., examples, code, etc.) for how to complete/compute a fact (e.g., assisting in the production of the fact in an active way, such as: "Here's how to do that"). The AI FCM tool 110 ensures that a fact meets the policy requirements at the time of creation, reducing the likelihood of incomplete or substandard information flowing downstream to other users.

The AI FCM tool 110 improves quality, efficiency, and consistency of FactSheets within a team and across teams. The AI FCM tool 110 increases visibility and aids in the coordination of a multi-person documentation effort. The AI FCM tool 110 increases awareness of documentation work that has been done and indicates what still needs to be done.

In certain embodiments, the AI FCM tool 110 provides a technique for the coordination and collaboration of fact producers via the inclusion of an intermediate and dynamic preview of the documentation state across fact producers within their working environment (e.g., via a user tool). In such embodiments, the AI FCM tool 110 enables selection of a default preview mechanism in a working environment and enables selection of a template (or a default selection of a template), which defines the facts that are to be collected and their associated renderings. FIG. 4A illustrates a there is a "See FactSheet" selector that gives access to a preview of a (partially completed) FactSheet. This preview may be rendered in different ways (compact, extended, side panel, hover, etc.) and within that views may show the facts (provided and missing), which are most relevant at this time for this role.

The AI FCM tool 110 retrieves facts from the facts repository using the definitions in the template, displays a preview based on the template's facts, and indicates missing or required facts in the preview. The AI FCM tool 110 also dynamically updates the preview to reflect the current state of the fact repository across multiple fact producers (i.e., the preview is updated as facts are being provided by multiple fact producers).

In certain embodiments, the AI FCM tool 110 provides a preview that identifies to the user missing facts and other policy-related requirements they are responsible for. The AI FCM tool 110 provides the user a way to store facts to the facts repository and displays those facts in the preview. The AI FCM tool 110 allows for version visualization and coordination (e.g., allows multiple producers to agree on which facts to save). The AI FCM tool 110 allows fact validation within prior to being committed to the fact repository. The fact validation may include validating a value (e.g., based on a policy indicating the value should have 3 decimals), determining whether a computation is accurate, etc. by using the policies. The AI FCM tool 110 provides conflict resolution when different fact producers have provided facts that conflict (e.g., with input from the fact producers or others). The AI FCM tool 110 provides fact quality evaluation based on the policies (e.g., a certain value is not allowed). The AI FCM tool 110 provides similar examples and definitions. The AI FCM tool 110 performs policy enforcement (immediate checks, acceptable values, etc.) on facts.

In certain embodiments, the AI FCM tool 110 enables collaborative and dynamic rendering and affirming of facts.

The FactSheet preview is dynamic and collaboration is supported through affordances.

In certain embodiments, the AI FCM tool 110 provides a preview that supports governance and collaboration by enabling the dynamic creation of FactSheets across users and tools.

Figure 8:
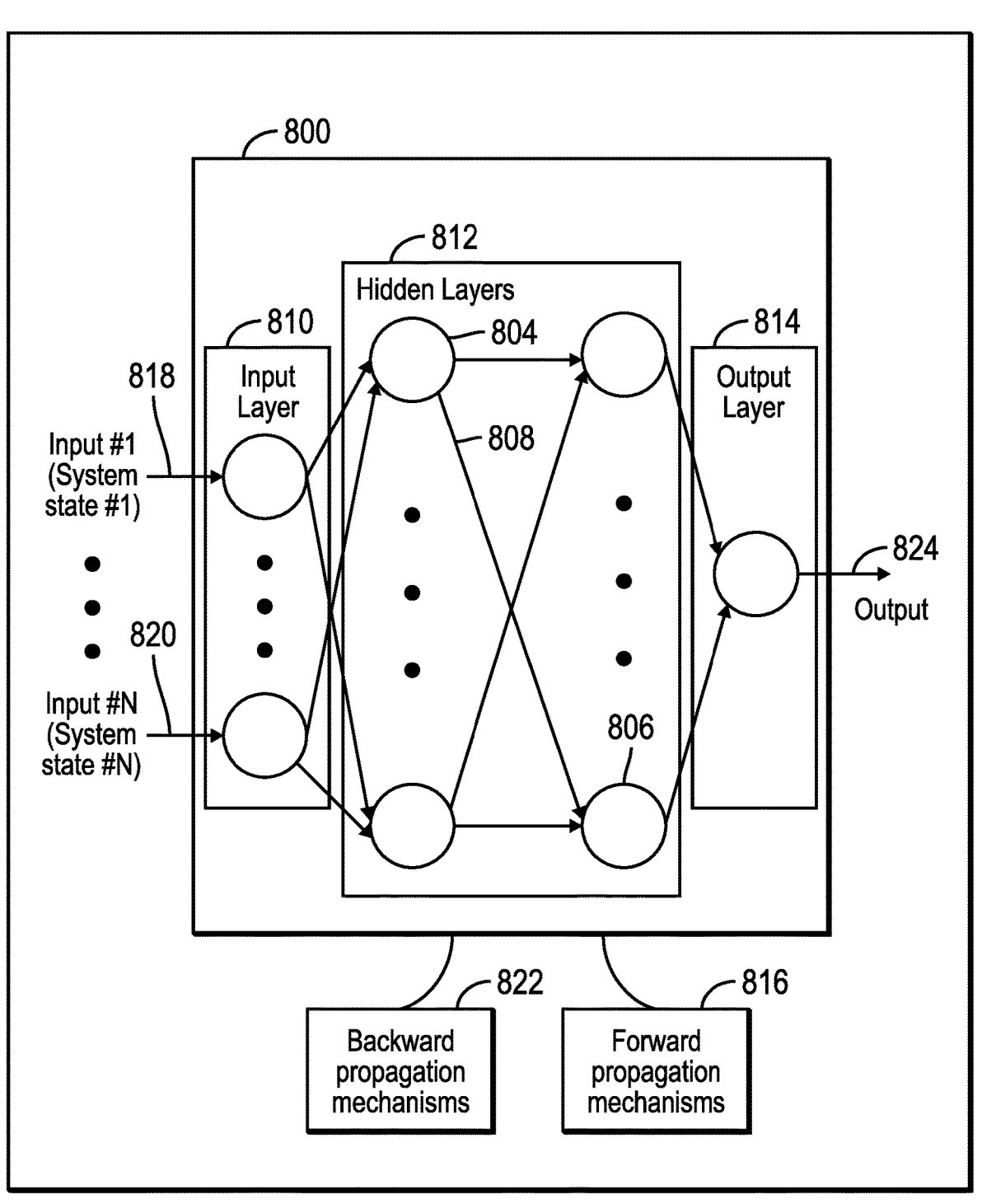
FIG. 8 illustrates, in a block diagram, details of a machine learning model 800 in accordance with certain embodiments.

FIG. 8 illustrates, in a block diagram, details of a machine learning model 800 in accordance with certain embodiments. In certain embodiments, the one or more models 130 are implemented using the components of the machine learning model 800.

The machine learning model 800 may comprise a neural network with a collection of nodes with links connecting them, where the links are referred to as connections. For example, FIG. 8 shows a node 804 connected by a connection 808 to the node 806. The collection of nodes may be organized into three main parts: an input layer 810, one or more hidden layers 812, and an output layer 814.

The connection between one node and another is represented by a number called a weight, where the weight may be either positive (if one node excites another) or negative (if one node suppresses or inhibits another). Training the machine learning model 800 entails calibrating the weights in the machine learning model 800 via mechanisms referred to as forward propagation 816 and backward propagation 822. Bias nodes that are not connected to any previous layer may also be maintained in the machine learning model 800. A bias may be described as an extra input of 1 with a weight attached to it for a node.

In forward propagation 816, a set of weights are applied to the input data 818 . . . 820 to calculate the output 824. For the first forward propagation, the set of weights may be selected randomly or set by, for example, a system administrator. That is, in the forward propagation 816, embodiments apply a set of weights to the input data 818 . . . 820 and calculate an output 824.

In backward propagation 822 a measurement is made for a margin of error of the output 824, and the weights are adjusted to decrease the error. Backward propagation 822 compares the output that the machine learning model 800 produces with the output that the machine learning model 800 was meant to produce, and uses the difference between them to modify the weights of the connections between the nodes of the machine learning model 800, starting from the output layer 814 through the hidden layers 812 to the input layer 810, i.e., going backward in the machine learning model 800. In time, backward propagation 822 causes the machine learning model 800 to learn, reducing the difference between actual and intended output to the point where the two come very close or coincide.

The machine learning model 800 may be trained using backward propagation to adjust weights at nodes in a hidden layer to produce adjusted output values based on the provided inputs 818 . . . 820. A margin of error may be determined with respect to the actual output 824 from the machine learning model 800 and an expected output to train the machine learning model 800 to produce the desired output value based on a calculated expected output. In backward propagation, the margin of error of the output may be measured and the weights at nodes in the hidden layers 812 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning model 800 is configured to repeat both forward and backward propagation until the weights of the machine learning model 800 are calibrated to accurately predict an output.

The machine learning model 800 implements a machine learning technique such as decision tree learning, association rule learning, artificial neural network, inductive programming logic, support vector machines, Bayesian models, etc., to determine the output value 824.

In certain machine learning model 800 implementations, weights in a hidden layer of nodes may be assigned to these inputs to indicate their predictive quality in relation to other of the inputs based on training to reach the output value 824.

With embodiments, the machine learning model 800 is a neural network, which may be described as a collection of "neurons" with "synapses" connecting them.

With embodiments, there may be multiple hidden layers 812, with the term "deep" learning implying multiple hidden layers. Hidden layers 812 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 816 and the backward propagation 822.

In backward propagation 822, embodiments measure the margin of error of the output and adjust the weights accordingly to decrease the error.

Neural networks repeat both forward and backward propagation until the weights are calibrated to accurately predict the output 824.

In certain embodiments, the inputs to the machine learning model 800 are a fact, a fact definition, and metadata, and the outputs of the machine learning model 800 are one or more outputs from a group comprising: suggestions, examples, and supporting information about the fact.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
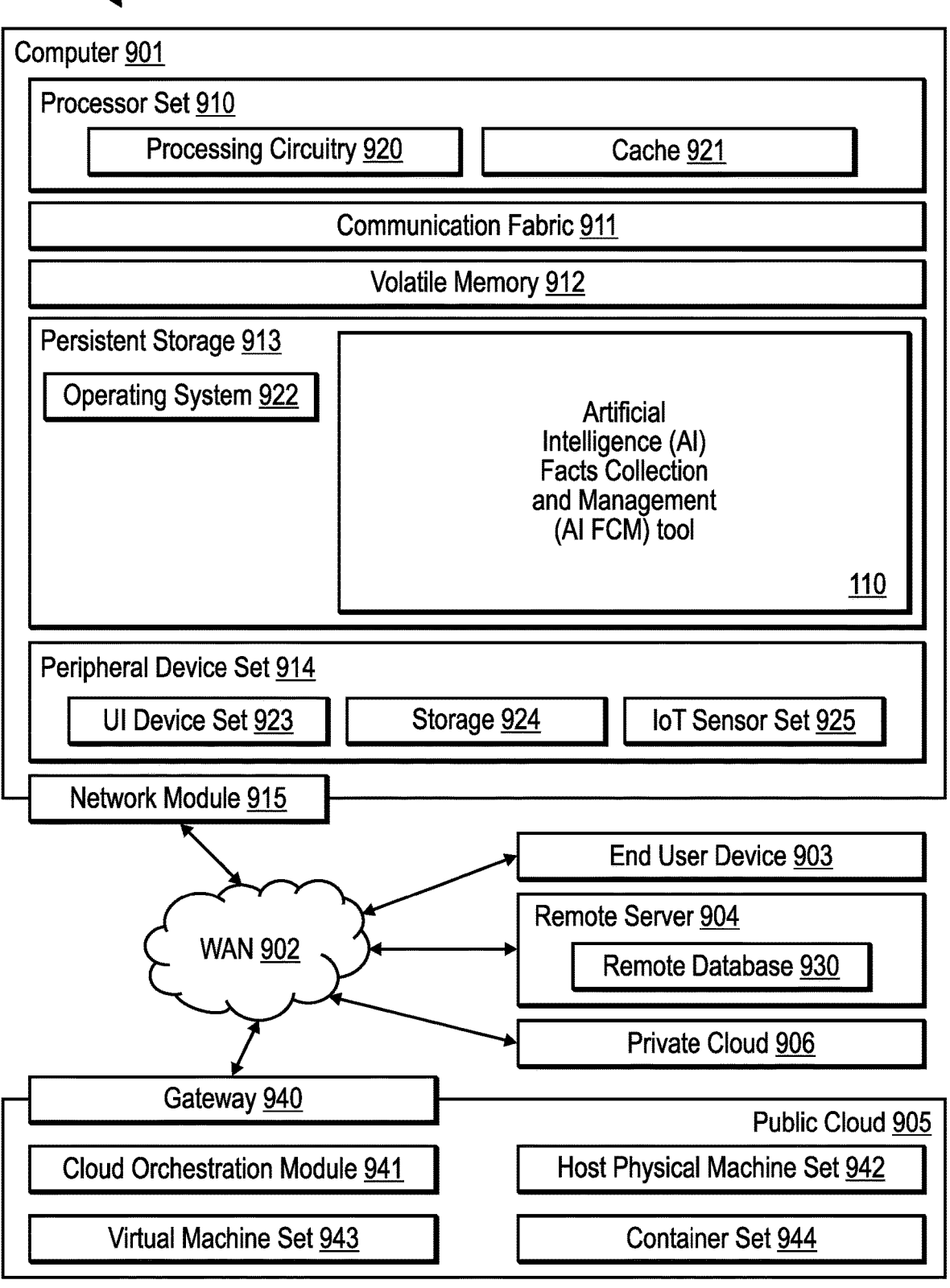
FIG. 9 illustrates a computing environment in accordance with certain embodiments.

FIG. 9 illustrates a computing environment 900 in accordance with certain embodiments. Computing environment 900 contains an example of an environment for the execution of at least some of the computer code involved in performing the inventive methods, such as the AI FCM tool 110. In addition to block 110, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 110, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 110 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in block 110 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

In the described embodiment, variables a, b, c, i, n, m, p, r, etc., when used with different elements may denote a same or different instance of that element.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:

selecting a template from a plurality of templates, wherein the template includes definitions for identifying facts;

retrieving the facts from a facts repository based on the definitions;

determining that the facts are valid based on one or more policies;

generating a FactSheet using the template and the facts;

using a machine learning model to identify one or more deficient facts from the FactSheet;

displaying the FactSheet in a preview with the one or more deficient facts;

locating one or more facts corresponding to the one or more deficient facts; and updating the FactSheet to correct the one or more deficient facts with the corresponding facts.

2. The computer-implemented method of claim 1, further comprising operations for:

receiving new facts from a plurality of fact producers using a plurality of tools, and dynamically updating the FactSheet.

3. The computer-implemented method of claim 1, further comprising operations for:

inputting a fact, a fact definition, and metadata into a system to generate one or more outputs from a group comprising: suggestions, examples, and supporting information about the fact; and displaying the one or more outputs.

4. The computer-implemented method of claim 3, wherein the one or more outputs comprise one or more of: an explanation as to why a missing fact is required, an approach on how to provide the missing fact, and an example of the missing fact.

5. The computer-implemented method of claim 1, further comprising operations for:

displaying the FactSheet with a plurality of FactSheets;

in response to selection of the FactSheet, displaying the FactSheet in a new preview; and enabling interaction with the FactSheet via the new preview.

6. The computer-implemented method of claim 1, wherein the one or more deficient facts comprise one or more invalid facts, one or more missing facts or both one or more invalid facts and one or more missing facts.

7. The computer-implemented method of claim 1, wherein the preview is displayed in a user tool.

8. A computer program product, the computer program product comprising a computer readable storage medium having program instructions embodied therewith, the program instructions executable by a processor to cause the processor to perform operations for:

selecting a template from a plurality of templates, wherein the template includes definitions for identifying facts;

retrieving the facts from a facts repository based on the definitions;

determining that the facts are valid based on one or more policies;

generating a FactSheet using the template and the facts;

using a machine learning model to identify one or more deficient facts from the FactSheet;

displaying the FactSheet in a preview with the one or more deficient facts;

locating one or more facts corresponding to the one or more deficient facts; and updating the FactSheet to correct the one or more deficient facts with the corresponding facts.

9. The computer program product of claim 8, wherein the program instructions are executable by the processor to cause the processor to perform further operations for:

receiving new facts from a plurality of fact producers using a plurality of tools, and dynamically updating the FactSheet.

10. The computer program product of claim 8, wherein the program instructions are executable by the processor to cause the processor to perform further operations for:

inputting a fact, a fact definition, and metadata into a system to generate one or more outputs from a group comprising: suggestions, examples, and supporting information about the fact; and displaying the one or more outputs.

11. The computer program product of claim 10, wherein the one or more outputs comprise one or more of: an explanation as to why a missing fact is required, an approach on how to provide the missing fact, and an example of the missing fact.

12. The computer program product of claim 8, wherein the program instructions are executable by the processor to cause the processor to perform further operations for:

displaying the FactSheet with a plurality of FactSheets;

in response to selection of the FactSheet, displaying the FactSheet in a new preview; and enabling interaction with the FactSheet via the new preview.

13. The computer program product of claim 8, wherein the one or more deficient facts comprise one or more invalid facts, one or more missing facts or both one or more invalid facts and one or more missing facts.

14. The computer program product of claim 8, wherein the preview is displayed in a user tool.

15. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-readable memories, to perform operations comprising:

selecting a template from a plurality of templates, wherein the template includes definitions for identifying facts;

retrieving the facts from a facts repository based on the definitions;

determining that the facts are valid based on one or more policies;

generating a FactSheet using the template and the facts;

using a machine learning model to identify one or more deficient facts from the FactSheet;

displaying the FactSheet in a preview with the one or more deficient facts;

locating one or more facts corresponding to the one or more deficient facts; and updating the FactSheet to correct the one or more deficient facts with the corresponding facts.

16. The computer system of claim 15, wherein the operations further comprise:

receiving new facts from a plurality of fact producers using a plurality of tools, and dynamically updating the FactSheet.

17. The computer system of claim 15, wherein the operations further comprise:

inputting a fact, a fact definition, and metadata into a system to generate one or more outputs from a group comprising: suggestions, examples, and supporting information about the fact; and displaying the one or more outputs.

18. The computer system of claim 17, wherein the one or more outputs comprise one or more of: an explanation as to why a missing fact is required, an approach on how to provide the missing fact, and an example of the missing fact.

19. The computer system of claim 15, wherein the operations further comprise:

displaying the FactSheet with a plurality of FactSheets;

in response to selection of the FactSheet, displaying the FactSheet in a new preview; and enabling interaction with the FactSheet via the new preview.

20. The computer system of claim 15, wherein the one or more deficient facts comprise one or more invalid facts, one or more missing facts or both one or more invalid facts and one or more missing facts.

* * * * *